(No Model.)

M. A. ROONEY.
COMBINED TRUNK AND BED.

No. 327,595. Patented Oct. 6, 1885.

Witnesses:
Alfred Thomas
C. J. Thomas

Inventor:
Mary A. Rooney

UNITED STATES PATENT OFFICE.

MARY A. ROONEY, OF DE SMET, DAKOTA TERRITORY.

COMBINED TRUNK AND BED.

SPECIFICATION forming part of Letters Patent No. 327,595, dated October 6, 1885.

Application filed May 1, 1885. Serial No. 164,137. (No model.)

*To all whom it may concern:*

Be it known that I, MARY A. ROONEY, a citizen of the United States, residing at De Smet, in the county of Kingsbury and Territory of Dakota, have invented a new and useful Combined Trunk and Bed, of which the following is a specification.

My invention relates to a new and novel trunk with hinged sides, ends, and top, so constructed that when unfolded it makes a complete bed, and when folded forms a complete trunk. I attain these objects by the illustration in the accompanying drawings, in which—

Figure 1:
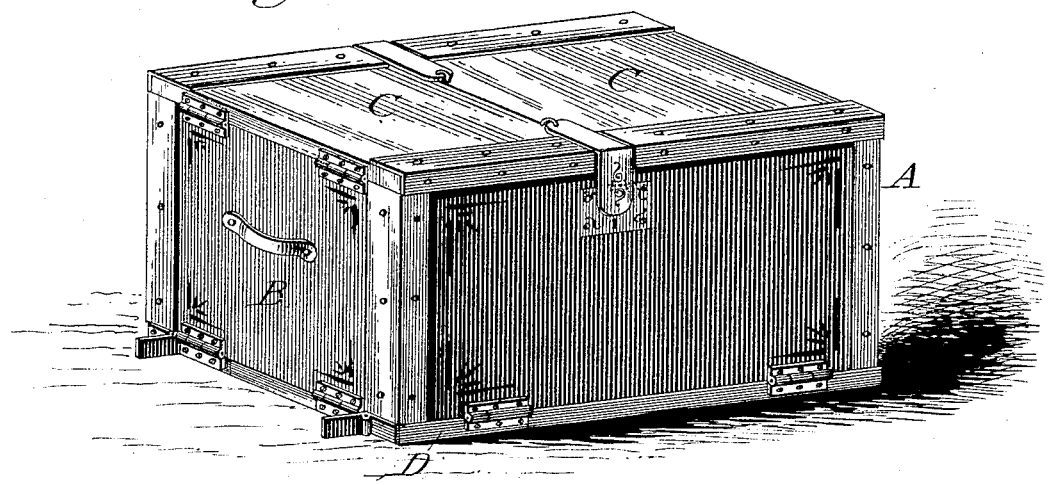
Figure 2:
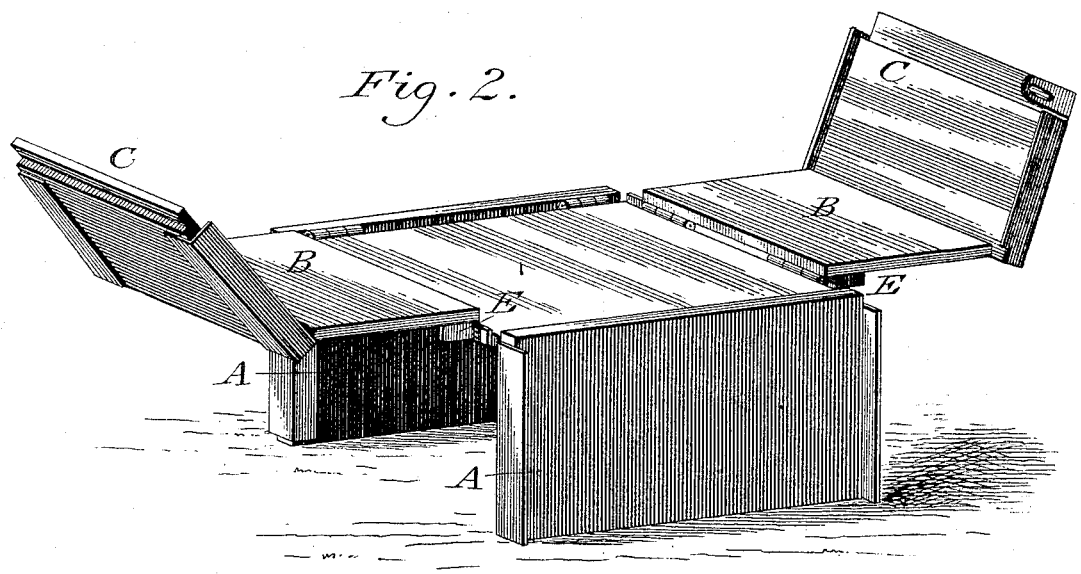

Figure 1 shows the combined trunk and bed as a trunk. Fig. 2 shows the trunk unfolded as when used as a bed.

Similar letters refer to similar parts throughout both views.

The sides are lettered A A, the ends B B, and cover C C. Fig. 2 shows it unfolded as a bed. A A represent sides adapted to be turned down or reversed, so that their top edges rest on the floor or ground. B B represent the ends hinged so as to turn back and form part of the bottom of the bed. E E are hinged supports, which can be so adjusted as to hold the ends in proper position when used as a bed. C C represent the cover or lid divided at the center, and each portion hinged to the ends B, and adapted to form head and foot boards when used as a bed. D is the bottom of trunk, also the bottom of bed when in conjunction with B B.

I claim as my invention—

A combined trunk and bed, consisting of the sides A, adapted to be turned down to form supports, the top or cover C, divided so that one half is hinged at each end to the end portions, B, which end portions are hinged to the bottom portion or supports, E, and provided with suitable stops, all substantially as shown and described, whereby the structure is made for interchangeable use, either as a trunk or bed, as set forth.

MARY A. ROONEY.

Witnesses:
    A. A. ANDERSON,
    GEORGE ADAMS.